United States Patent Office 2,731,430
Patented Jan. 17, 1956

2,731,430

VINYL AROMATIC HYDROCARBONS REACTED WITH GLYCERIDE OILS USING BORON HALIDE CATALYST

Henry Brunner, Langley, England, assignor to Imperial Chemical Industries Limited, a corporation of Great Britain No Drawing. Application July 27, 1951,
Serial No. 239,025

Claims priority, application Great Britain August 4, 1950

3 Claims. (Cl. 260—22)

This invention relates to interpolymers of vinyl aromatic hydrocarbons and drying oils and to coating compositions containing such interpolymers.

Polymers of vinyl aromatic hydrocarbons are not by themselves very satisfactory film-forming materials. Solutions of the polymers are undesirably viscous and furthermore, films of the polymers have poor weathering characteristics.

The desirability of using the polymers in oleoresinous varnishes has long been recognised but the difficulty has been to obtain a truly compatible combination of the polymers and the most commonly used drying oils, viz. linseed and dehydrated castor.

It is known to obtain polymers of improved compatibility by slow polymerisation of a vinyl aromatic hydrocarbon in the presence of a drying oil. Such reactions may take upwards of 18 hours and if in an attempt to reduce the reaction time, a free radical catalyst such as benzoyl peroxide is used, there is a tendency for the reaction to run-away resulting in the formation of incompatible products. The tendency for the reaction to run-away may be reduced by adding modifying agents such as $\alpha$-methyl styrene to the reaction mixture but we have now found that certain types of catalyst will work quite well even in the absence of such modifying agents.

According to the present invention therefore interpolymers are made by reacting a vinyl aromatic hydrocarbon and from 0.1 to 10.0% by weight of the hydrocarbon of a polyhydric alcohol ester of a fatty acid of a drying oil or a partially oxidised or partially polymerised derivative thereof, the reaction being catalysed by a halide of boron.

The reaction mixture may or may not include a solvent but in certain cases, for example where a product of higher molecular weight is required, a solvent may be used.

The invention may be illustrated by reference to the following examples in which all parts are by weight.

Example I

To a stirred mixture of 20 parts of linseed oil and 2.2 parts of boron fluoride hydrate heated to 100° C. was added dropwise 200 parts of styrene. The initial exothermic reaction caused the temperature of the reaction mixture to rise to 130° C. The remaining styrene was added with the temperature more or less constant at 100° C. The styrene addition occupied 90 minutes after which the mixture was heated for a further hour at 100° C. and then taken to 200° C. with $CO_2$ blowing to remove catalyst. No styrene monomer distilled over thus indicating the "fixation" of all or nearly all of the styrene.

The product, when cool, was a clear soft solid. It was found to be soluble in white spirit, linseed oil, blown linseed oil, 800 poise stand oil and linseed oil-modified alkyd resin (unthinned).

Example II 100 parts of styrene were gradually added to a mixture of 4 parts of linseed oil containing 2 parts of boron fluoride hydrate. The experimental procedure was similar to that described in Example I. The product was a soft solid resin of acid value 4.7 mgms. KOH per gm. It was completely miscible with white spirit and linseed oil but largely insoluble in blown linseed oil and linseed stand oil.

Example III

The charge and procedure was as for Example II but the varnish linseed oil was replaced by blown linseed oil. The resulting resin was clear and even softer than the product of Example II. The resin was completely miscible with varnish linseed oil, blown linseed oil and linseed oil-modified alkyd resin.

Example IV

Repeating Example III with a styrene/blown linseed oil ratio of 50:1 by weight a product was obtained which was a clear viscous liquid of acid value 4.0 mgms. KOH per gm. This liquid resin was similar to the product of Example III in its solubility characteristics.

Example V

The procedure described in Example III was adopted for the preparation of polystyrene based on 1000 parts of styrene monomer and 10 parts of blown linseed oil. The product was a pale viscous liquid of acid value 1.7 mgms. KOH per gm.

The resin, when cold blended or cooked into drying oils at resin:oil ratios of 1:2, 1:2 and 1:3, gave varnishes soluble in white spirit. Films of these varnishes dried to clear, pale films free from any signs of haze or streakiness so often associated with styrene-oil copolymer.

Example VI

A mixture of 1 part of low viscosity dehydrated castor oil containing 1 part of boron fluoride hydrate was treated with 5 parts of styrene. The temperature rose after a few minutes from 30° C. to 60° C. The mixture was then heated to 100° C. and the remaining 95 parts of styrene gradually added at 100° C. over a period of 45 minutes. After a further one hour at 100° C. the mixture was taken to 200° C. and a stream of $CO_2$ employed to assist in the removal of the catalyst. The product was a sticky solid of acid value 2.2 mgms. KOH per gm. The yield of resin was 85% on the styrene charge; 15 parts of distillate were collected.

Example VII

A mixture of 20 parts of benzene, 2 parts of 30 poise linseed stand oil and 2 parts of boron fluoride hydrate were heated to the temperature of reflux (80° C.). The source of heating was then removed and 100 parts of styrene added dropwise to the stirred mixture. The rate of styrene addition was governed by the ensuing exothermic reaction which maintained the mixture at the temperature of gentle refluxing. This reflux temperature gradually rose to 107° C. On the completion of the styrene addition external heating was again applied for 1 hour and the reflux temperature rose to 122° C. The mixture was finally distilled to 200° C. whilst passing a stream of $CO_2$ through the mixture to remove the catalyst and solvent.

The product was a light-brown brittle resin with a melting point of 50° to 61° C.

In general the presence of an inert solvent during the polymerisation process results in a product with a higher melting point and with drying oil-soluble properties similar to those of the interpolymers made in the absence of solvent. The higher melting point is advantageous since brittle resins are much easier to handle than are soft, sticky resins.

In the examples the catalyst is removed by raising the temperature of the reaction mixture to 200° C. and blowing a stream of an inert gas, such as carbon dioxide, through it. It has been found that complete removal of the catalyst by blowing with an inert gas at temperatures below 140° C. is difficult, possibly due to the catalyst being combined in a complex. At temperatures above 140° C. the catalyst complex will tend to dissociate but an upper temperature limit to catalyst removal is set by the necessity for avoiding depolymerisation of the interpolymer. This will begin to occur at temperatures above 240° C. and consequently the preferred temperature range in which removal of the catalyst may be carried out is from 140–240° C.

The interpolymers are a very convenient means of introducing styrene into coating compositions. For example, they may be cooked into oleoresinous vehicles by processes similar to those used for rosin, or they may be incorporated in alkyd resins during the polymerisation stage or during the esterification stage or may even be added to any drying oil used in the alkyd resin prior to the monoglyceride stage.

What we claim is:

1. A coating composition forming haze-free films comprising an oleoresinous vehicle selected from the group consisting of linseed oil and linseed oil-modified alkyd resin and the interpolymer produced by reacting a monovinyl monocyclic aromatic hydrocarbon with from 0.1 to 10 per cent, by weight of the hydrocarbon, of a drying oil in the presence of a halide of boron as catalyst.

2. A coating composition forming haze-free films comprising an oleoresinous vehicle selected from the group consisting of linseed oil and linseed oil-modified alkyd resin and the interpolymer produced by reacting a monovinyl monocyclic aromatic hydrocarbon with from 0.1 to 10 per cent, by weight of the hydrocarbon, of linseed oil in the presence of a halide of boron as catalyst.

3. A coating composition forming haze-free films comprising an oleoresinous vehicle selected from the group consisting of linseed oil and linseed oil-modified alkyd resin and the interpolymer produced by reacting a monovinyl monocyclic aromatic hydrocarbon with from 0.1 to 10 per cent, by weight of the hydrocarbon, of a drying oil in the presence of a halide of boron as catalyst, said interpolymer-oleoresinous vehicle ratio being from 1:1 to 1:3.

References Cited in the file of this patent

UNITED STATES PATENTS

| Number | Name | Date |
|---|---|---|
| 2,190,906 | Stoesser | Feb. 20, 1940 |
| 2,190,915 | Bass | Feb. 20, 1940 |
| 2,276,176 | Flint | Mar. 10, 1942 |
| 2,392,710 | Wakeford | Jan. 18, 1946 |
| 2,395,504 | Rubens | Feb. 26, 1946 |
| 2,470,757 | Bobalek | May 24, 1949 |
| 2,567,137 | Wakeford | Sept. 4, 1951 |

OTHER REFERENCES

Hewitt: Journal of Oil and Color Chemists Association, vol. 29, pages 109–128, June 1946 (pages 118–120 of especial interest).

Pepper: Quarterly Reviews, VIII, No. 1, 1954, pages 88–93 and 101.